United States Patent
Hyde et al.

(10) Patent No.: US 9,646,186 B1
(45) Date of Patent: *May 9, 2017

(54) RECTIFIER BIASING FOR SELF-TUNING RFID TAGS

(71) Applicant: Impinj, Inc., Seattle, WA (US)

(72) Inventors: John D. Hyde, Corvallis, OR (US); Harley K. Heinrich, Snohomish, WA (US); Charles Peach, Seattle, WA (US); Christopher J. Diorio, Shoreline, WA (US); Theron Stanford, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,162

(22) Filed: Feb. 12, 2016

Related U.S. Application Data

(60) Provisional application No. 62/116,268, filed on Feb. 13, 2015.

(51) Int. Cl.
  *G06K 7/10* (2006.01)
  *G06K 19/07* (2006.01)
  *G06K 19/077* (2006.01)

(52) U.S. Cl.
  CPC ..... *G06K 7/10297* (2013.01); *G06K 7/10198* (2013.01); *G06K 19/0726* (2013.01); *G06K 19/07754* (2013.01); *G06K 19/07773* (2013.01); *G06K 19/0723* (2013.01)

(58) Field of Classification Search
  CPC ......... G06K 7/10297; G06K 19/07773; G06K 19/07754; G06K 19/0726; G06K 19/0723; G06K 19/0702; G06K 19/0707; G06K 7/10198; H01L 27/067; H01L 2924/0002
  USPC .................. 340/10.5, 10.34, 10.1, 10.6, 334
  See application file for complete search history.

(56) References Cited

U.S. PATENT DOCUMENTS

| | | | |
|---|---|---|---|
| 8,952,792 B1* | 2/2015 | Srinivas | H01Q 1/2208 340/10.1 |
| 9,471,816 B1* | 10/2016 | Hyde | G06K 7/10297 |
| 2010/0060546 A1* | 3/2010 | Robson | H01Q 1/288 343/912 |
| 2010/0079246 A1* | 4/2010 | Mikalo | H01L 21/76883 340/10.1 |
| 2014/0070010 A1* | 3/2014 | Diorio | G06K 19/07773 235/492 |
| 2014/0073071 A1* | 3/2014 | Diorio | G06K 19/0723 438/26 |
| 2014/0144992 A1* | 5/2014 | Diorio | G06K 7/10297 235/488 |
| 2015/0227832 A1* | 8/2015 | Diorio | G06K 19/07745 235/492 |

* cited by examiner

*Primary Examiner* — Ali Neyzari
(74) *Attorney, Agent, or Firm* — Turk IP Law, LLC

(57) ABSTRACT

Impedance matching between an RFID IC and an antenna may be tuned to increase the amount of power that the IC can extract from an RF wave incident on the antenna. A tuning circuit tunes the impedance matching by adjusting a variable impedance coupling the IC and the antenna and/or adjusting a bias of a rectifier in the IC. The tuning circuit may adjust the variable impedance and/or the rectifier bias based on predetermined or stored tuning settings. For example, the tuning circuit may retrieve stored tuning settings from a nonvolatile memory (NVM) configured to operate with limited functionality at low power.

20 Claims, 7 Drawing Sheets

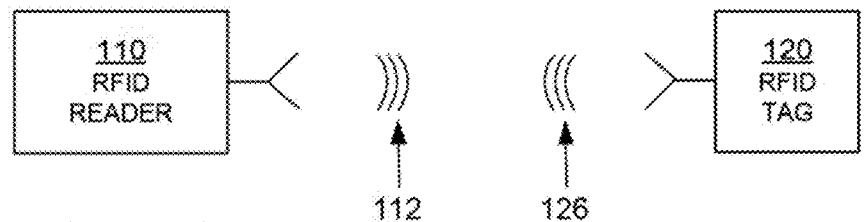
FIG. 1
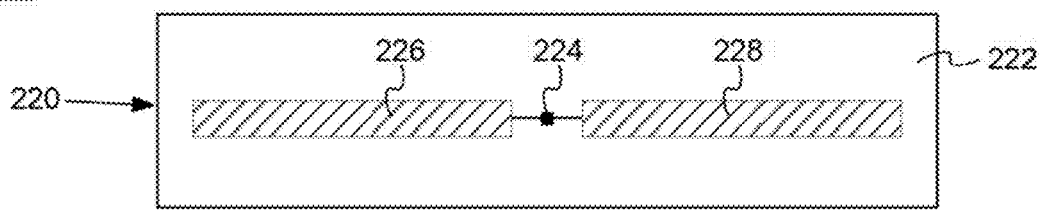
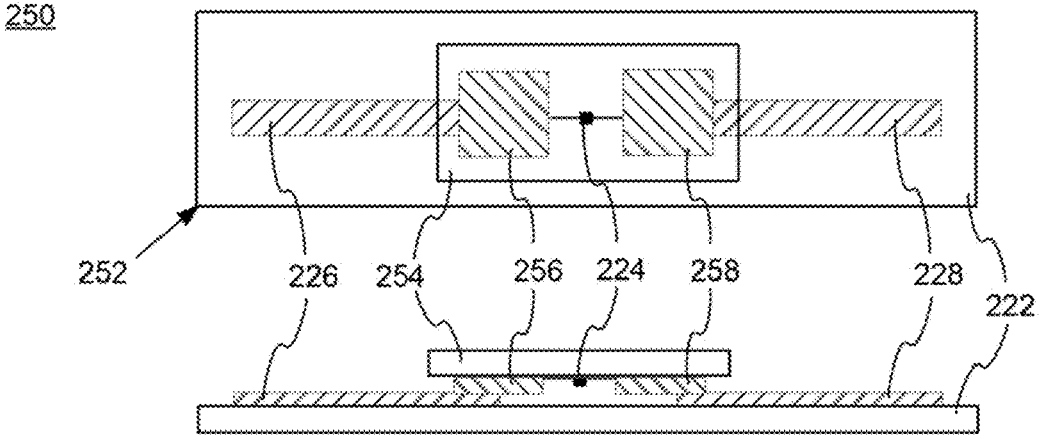
FIG. 2

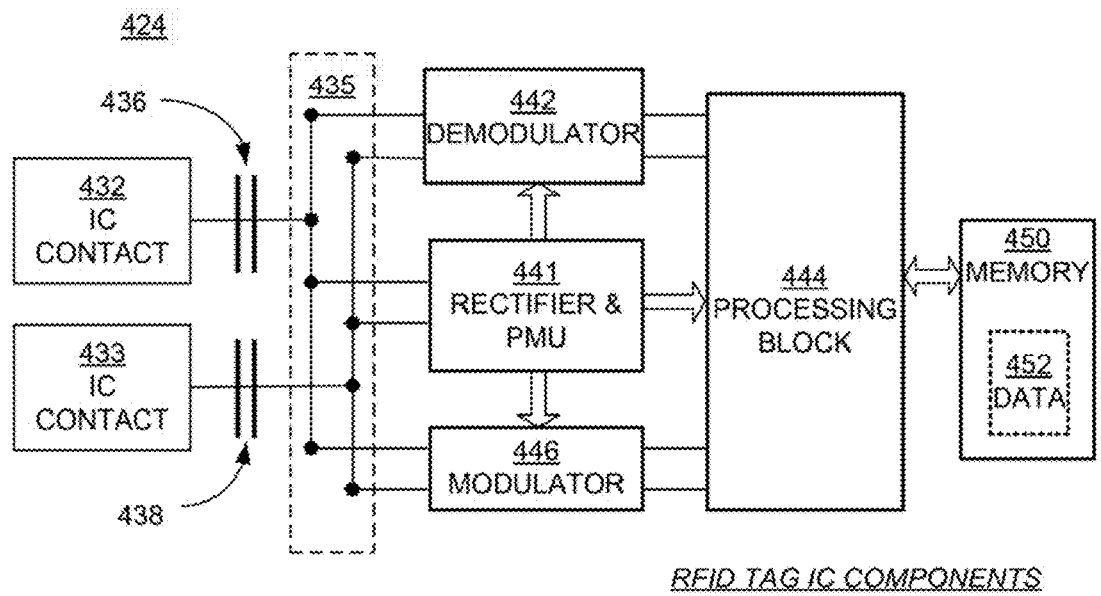
FIG. 4
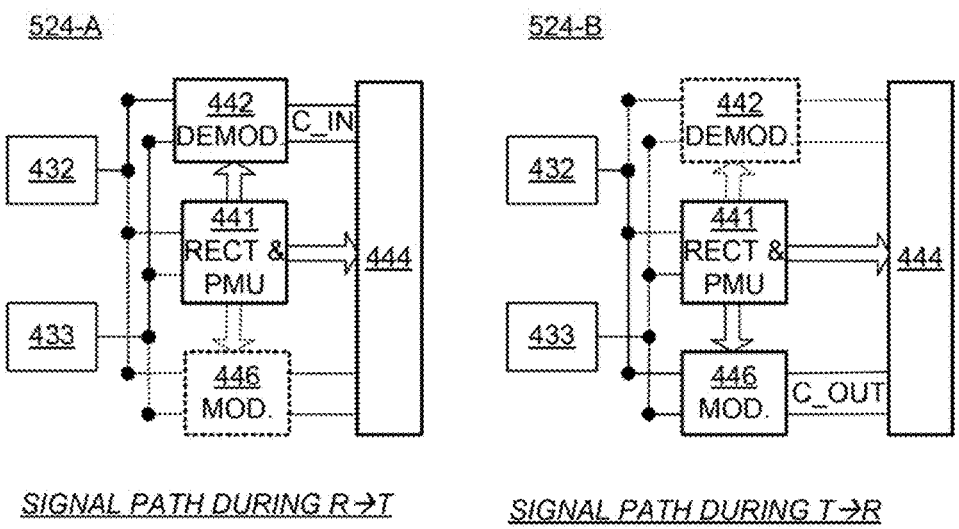
FIG. 5A     FIG. 5B

RECTIFIER BIASING FOR SELF-TUNING RFID TAGS

CROSS REFERENCE TO RELATED APPLICATION

This Application Claims the benefit of U.S. Provisional Application Ser. No. 62/116,268 filed on Feb. 13, 2015. The Provisional Application is incorporated herein by reference.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to tuning impedance matching between an RFID IC and an antenna to increase the amount of power that the IC can extract from an RF wave incident on the antenna. A tuning circuit tunes the impedance matching by adjusting a variable impedance coupling the IC and the antenna and/or adjusting a bias of a rectifier in the IC. The tuning circuit may adjust the variable impedance and/or the rectifier bias based on predetermined or stored tuning settings. For example, the tuning circuit may retrieve stored tuning settings from a nonvolatile memory (NVM) configured to operate with limited functionality at low power.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
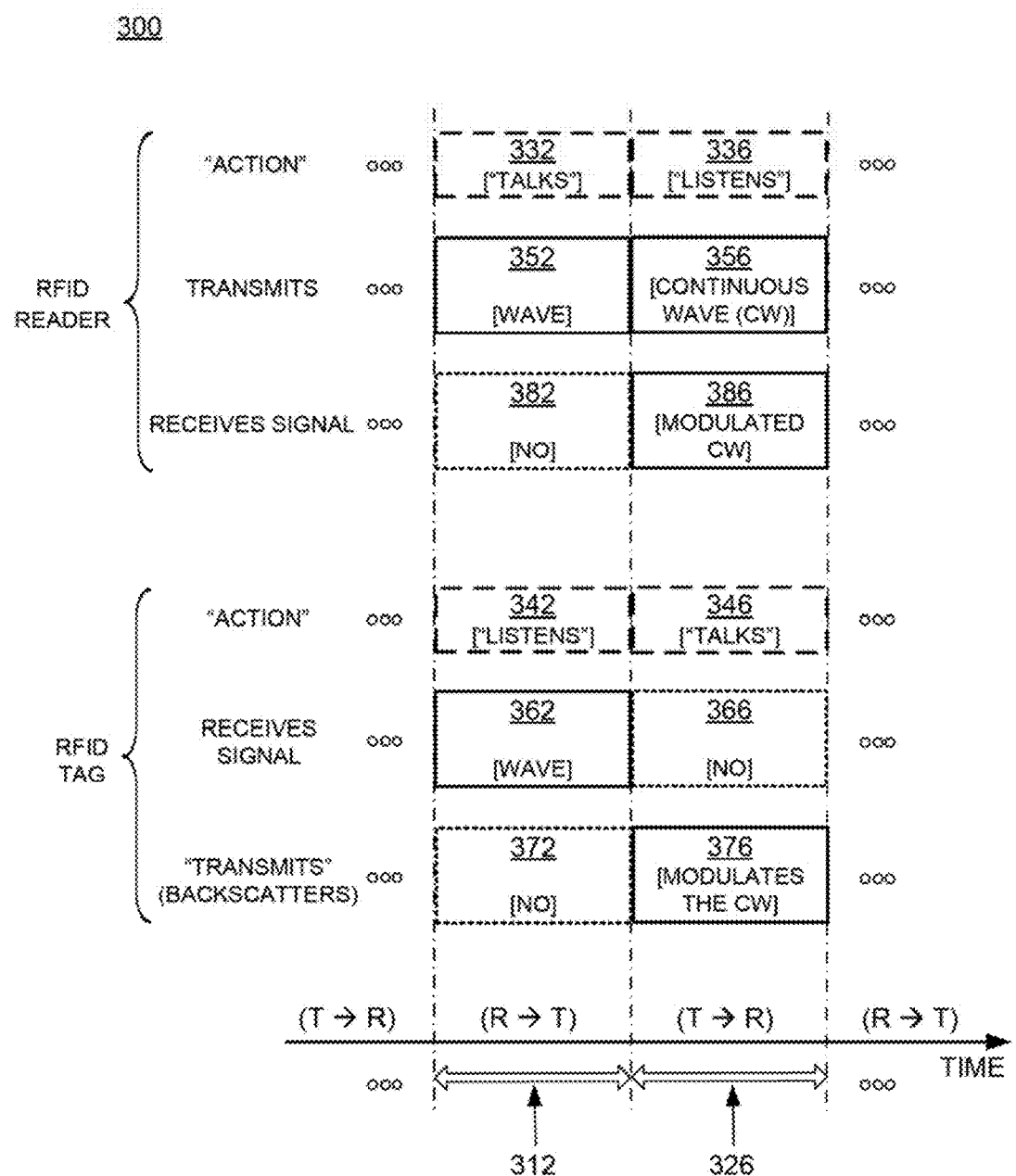
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art, and may be include one-time-programmable memory or memory capable of multiple writes and/or erasures. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by EPCglobal, Inc.

("Gen2 Specification"), versions 1.2.0 and 2.0.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/288 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches that can selectively route a signal, and so on. In some embodiments, circuit 424 includes optional capacitors 436 and/or 438. If present, capacitors 436/438 capacitively couple IC contacts 432/433 to signal-routing section 435, which in turn electrically couples to other components of circuit 424 described below. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or at least partly external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on. In some embodiments, circuit 424 may include a clock generator circuit that generates a clock signal that may be used by processing block 444 and/or other blocks.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Passive RFID tags rely on energy extracted from an RF wave to power the tag IC. In general, the efficiency of the RF power transfer from an RFID reader to a passive tag's IC directly affects the operational range of the RFID system. Accordingly, an RFID tag may include a matching network coupled between the IC and the antenna for matching the antenna impedance to the IC input impedance, thereby maximizing power transfer to the IC. This matching network may employ discrete elements such as capacitors or inductors, or may be formed by the design of the antenna itself, and may be part of the antenna, part of the IC, part of both, or a standalone component. To ensure that as much of the RF power incident on the antenna is transferred to the IC, the source (antenna) impedance should be the complex conjugate of the load (IC) impedance. Unfortunately, antenna impedance may vary with environmental conditions such as humidity, substrate material, dielectric materials near the tag, etc. Similarly, IC impedance may vary with the processing of the IC itself. A matching network that matches antenna and IC impedances for one tag and one frequency under one condition may not match antenna and IC impedances for another IC at another frequency under a different condition. When the impedances vary the matching between the antenna and IC degrades, tag sensitivity degrades, and the operational range of the RFID system is reduced.

Figure 6:
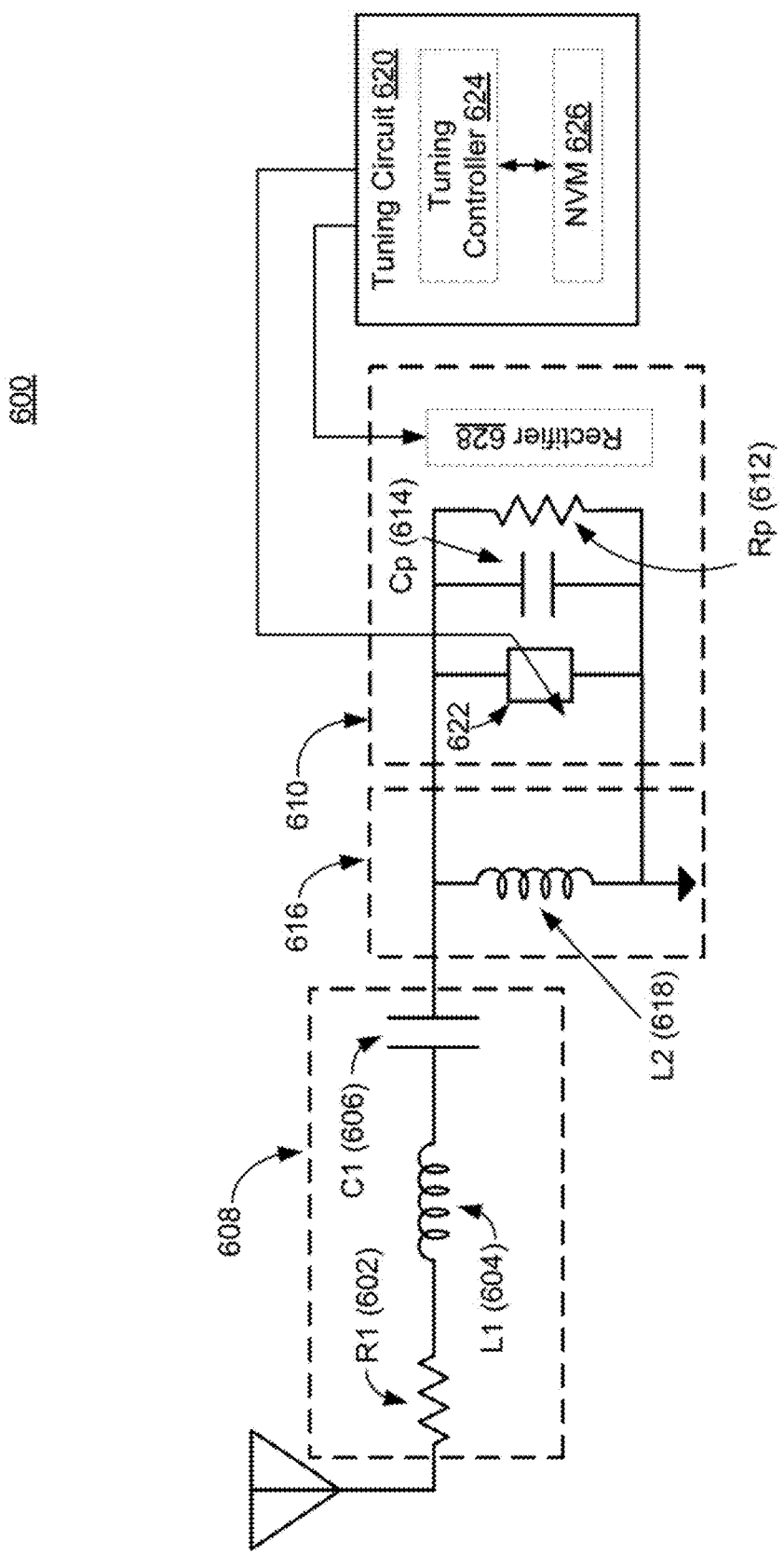
FIG. 6 depicts an RFID tag front-end equivalent circuit including a tuning circuit with a tuning controller and a memory.

FIG. 6 is a diagram of an RFID tag front-end equivalent circuit 600 including a tuning circuit 620. RFID tag front-end equivalent 600 models the various impedances of an RFID tag and includes antenna section 608, IC input section 610, and matching network 616 that couples antenna section 608 to IC input section 610. Antenna section 608 includes inductor L1 604 and capacitor C1 606, which model the reactive portion of the antenna impedance, and resistor R1 602, which models the real portion of the antenna impedance. IC input section 610 includes a resistor Rp 612 that models the input resistance of the IC, a capacitor Cp 614 that models the RF input reactance of the IC, a tuning element 622, and a rectifier 628 configured to extract power from incident RF waves. Capacitor Cp 614 and resistor Rp 612 model the complete RFID tag RF input impedance, portions of which may be contained in tuning element 622, rectifier 628, and other RFID tag circuits not shown in FIG. 6. IC input section 610, or more specifically tuning element 622 and rectifier 628 in IC input section 610, is coupled to tuning circuit 620. Matching network 616 includes inductor L2 618 that models the inductance of matching network 616.

To maximize power transfer between antenna and IC in equivalent circuit 600, the reactance of inductor L1 604 should be the complex conjugate of the reactance of capacitor C1 606, and the reactance of inductor L2 618 should be the complex conjugate of the reactance of IC input section 610. In this "matching" situation the equivalent circuit 600 reduces to the resistors R1 602 and Rp 612 in series.

Typical matching networks use components with static values, and therefore can only maximize power transfer and extraction for particular values of antenna and IC impedance. However, antenna and IC impedance values can vary greatly. For example, RFID tags often operate over a range of frequencies. Because antenna and IC impedances vary as a function of frequency, a matching network that is configured for maximum power transfer at one frequency may not maximize power transfer at a different frequency.

Other factors may also cause impedance variations and degrade power transfer. Statistical variations in component values during manufacturing may cause the actual antenna and IC impedances to differ from their designed values. Similarly, the environment in which the tag operates (e.g., operating medium such as air, water, etc., or environmental conditions such as temperature, humidity, time, pressure, etc.) or the dielectric properties of an item to which the tag is attached may alter the effective antenna impedance. Consequently, designing a matching network with static-valued components involves design compromises that typically provide good power-conversion efficiency in some circumstances but lower efficiency in other circumstances.

In contrast, in circuit 600 tuning element 622 and rectifier 628 can be used to compensate for impedance mismatch between antenna 608 and IC input section 610. Tuning element 622 may be implemented as a continuously variable element (e.g., a resistor, capacitor, or inductor) or as one or more switched elements. Of course, as will be apparent to one of ordinary skill in the art, tuning element 622 can include one or more variable transistor(s), variable capacitor(s), variable inductor(s), variable-length transmission line(s), variable resistor(s), etc. Any of these elements can be continuously variable or discretely variable (i.e. switched). For example, tuning element 622 may include one or more switched transistors, switched diodes, switched capacitors, switched inductors, switched transmission lines, and/or switched resistors. In some embodiments, tuning element 622 may only provide resistive components (i.e., no capacitors, inductors, or transmission lines), while in other embodiments tuning element 622 may only provide variable reactive components. In one example embodiment tuning element 622 may be an array of switchable capacitors.

In some embodiments, rectifier 628 may be implemented to include an adjustable bias, which may include a bias current and/or a bias voltage. The rectifier bias may be adjusted to change the RF input impedance (Rp 612 and/or Cp 614) and/or the rectifier efficiency, which may be defined as the ratio of rectifier DC output extracted power to the rectifier RF input power. The rectifier bias adjustment may be implemented by means of one or more switched resistors, switched transistors, and/or switched diodes. In some implementations one or more continuously variable transistors and/or resistors may be used to adjust the rectifier bias.

Tuning circuit 620 may be configured to adjust the impedance of IC input section 610 by adjusting the impedance of tuning element 622 and/or the bias of rectifier 628. Tuning circuit 620 may be a standalone circuit or integrated into an IC circuit block, such as one of the blocks in IC 424 of FIG. 4. In some embodiments, tuning circuit 620 may include a tuning controller 624 coupled to a nonvolatile memory (NVM) 626.

Tuning controller 624 may be configured to adjust IC input section 610 to increase the amount of power that the IC extracts from an incident RF wave, and may adjust IC input section 610 based on stored data, real-time data, one or more impedance-adjustment algorithms, or a combination. In some embodiments, tuning controller 624 may be configured to determine an amount of extracted power and to adjust IC input section 610 accordingly. For example, tuning controller 624 may detect the amount of RF power extracted by the IC from the antenna via a power detector (which may be integrated into tuning circuit 620, tuning controller 624, and/or in another IC circuit such as a rectifier or PMU) and/or by measuring a supply voltage developed by the IC from the incident RF wave. Tuning controller 624 may further determine, as it adjusts IC input section 610, whether the detected extracted power is increasing or decreasing (for example, using a comparator), and adjust the tuning process accordingly.

In some embodiments, tuning controller 624 may adjust IC input section 610 based on data stored in NVM 626. NVM 626 may be configured to store and maintain data even in the absence of power, and may include or be implemented with any of the memory technologies described above. In some embodiments, NVM 626 may be configured to store data as charge in one or more floating gate structures or devices. NVM 626 may store information about tag tuning, such as settings for tuning element 622 and/or rectifier 628 under various environmental conditions. These settings may be programmed into NVM 626 before or after IC integration into an RFID tag.

In some embodiments the settings stored in NVM 626 may be dynamically adjusted. For example, stored tuning settings may be overwritten or supplemented with new settings that provide better impedance matching, during a tag-tuning process or at other suitable times. NVM 626 may also store data about the power extracted and/or reflected by the tag. For example, NVM 626 may store previous values of extracted and/or reflected power for use in an iterative tag-tuning process, where successively detected values of extracted/reflected power are used to evaluate the effect of tuning adjustments. Tuning controller 624 may be configured to update or overwrite the stored tuning settings if new settings provide more extracted RF power. In some embodiments. NVM 626 may store one or more previous tuning settings and their associated extracted/reflected power values. Tuning controller 624 may then use the stored previous tuning settings and associated power values to guide subsequent tuning adjustments.

While FIG. 6 depicts NVM 626 within tuning circuit 620, in other embodiments NVM 626 may be in another portion of an RFID IC or tag. For example, NVM 626 may be integrated into an RFID IC, or may be on the tag external to but coupled to the IC.

In some embodiments, tuning controller 624 may adjust IC input section 610 based on one or more other hardware components configured to provide a known output, instead of or in addition to data read out of NVM 626. For example, a tag or IC hardware component may be configured to start up with a known or user-defined output value, such as a voltage value, a current value, or a data value. Tuning controller 624 may then adjust IC input section 610 based on the output value.

In some embodiments, one or more persistent bits or flags storing data using capacitor charge may be used to provide the output value used by tuning controller 624 to adjust IC input section 610. Such persistent bits may include one or more capacitors, and stored data may be represented by the amount of charge stored in the capacitors.

In some embodiments, one or more hysteretic analog comparators may be used to provide the output value used to adjust IC input section 610. A comparator's output value may depend on its startup conditions, which in turn may be configurable. Accordingly, a comparator's initial startup conditions may be adjusted to provide a suitable output value for tuning controller 624 to use for adjusting IC input section 610.

In some embodiments, one or more logic flip-flops (i.e., bistatic multivibrators or latches) with user-configurable startup conditions may be used to provide the output value used to adjust IC input section 610, similar to the comparator described above.

In some embodiments tuning controller 624 may adjust IC input section 610 upon command from an external entity (e.g., an RF reader). In other embodiments processing block 624 may also (or instead) adjust IC input section 610 based on one or more environmental conditions. In some embodiments tuning controller 624 may adjust IC input section 610 every time there is sufficient power for tuning circuit 620 to operate.

In some embodiments, tuning circuit 620 is operable at an RF power level lower than that needed to operate the rest of the tag IC. For example, suppose that an RFID tag without tuning circuit 620 receives incident RF power sufficient to power the tag IC, but suffers from an impedance mismatch between the antenna and the IC such that the antenna does not transfer enough power to the IC to enable operation. In this case the incident RF field must be increased to enable to IC to operate. Now suppose that the tag is equipped with IC input section 610 having tuning element 622 and/or rectifier 628 and with tuning circuit 620. Further suppose that tuning circuit 620 is able to operate at an incident RF power level below the threshold for IC operation. In this case the tuning circuit can power-up and adjust IC input section 610 to reduce the impedance mismatch and improve power transfer between the antenna and the IC and/or adjust rectifier 628 to improve rectifier efficiency, thereby allowing the IC to extract enough power from the incident RF wave to operate.

Figure 7:
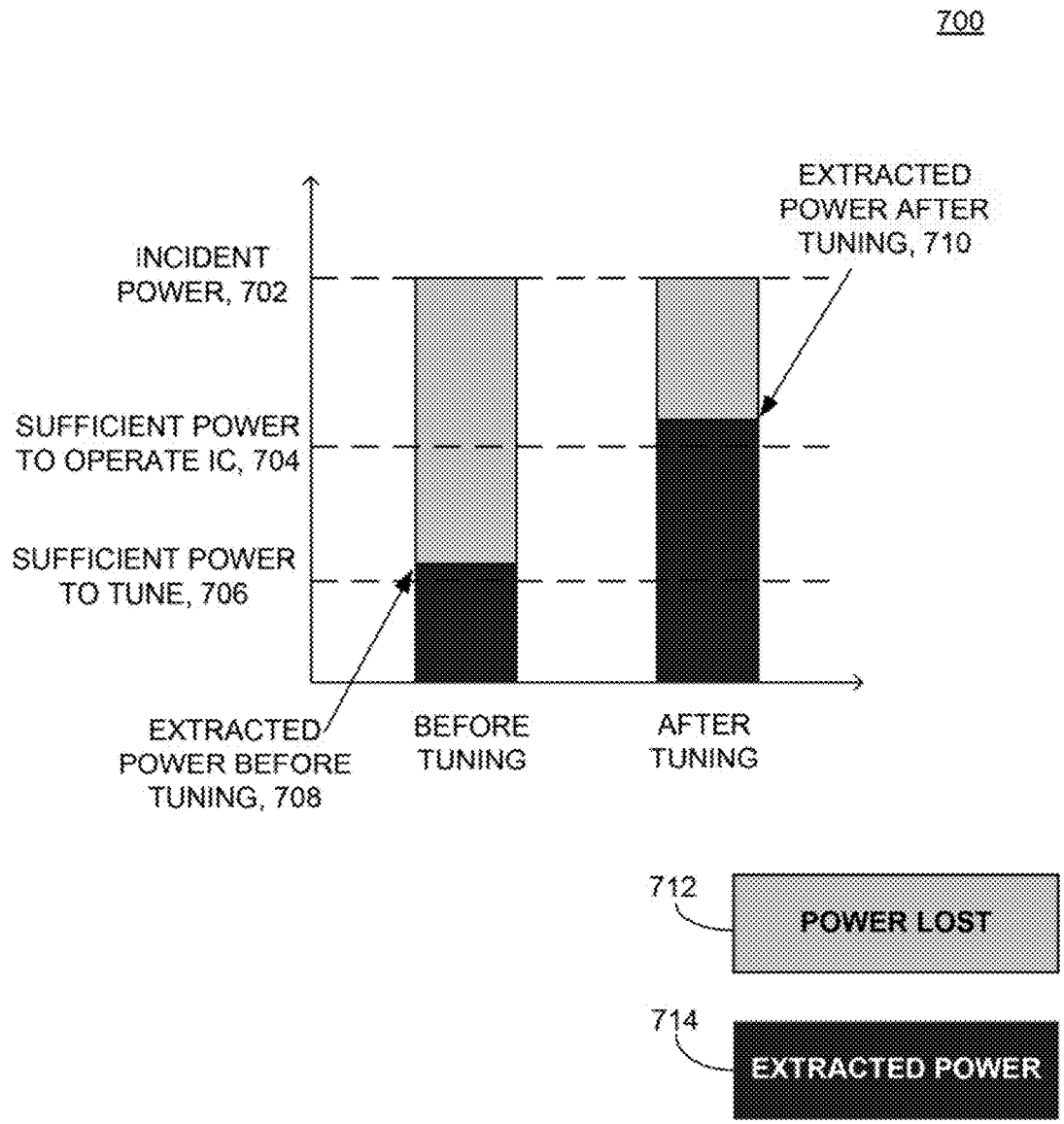
FIG. 7 illustrates the amount of power extracted and lost before and after tuning according to embodiments.

FIG. 7 is a chart 700 depicting power extracted (represented by black, 714) and power lost (represented by gray, 712) by an RFID IC such as IC 424 of FIG. 4 during a tag tuning process. Power may be lost via reflection due to an impedance mismatch or due to resistive losses within the antenna, matching network, and/or IC. The vertical axis of chart 700 measures power and the horizontal axis shows two time periods: before the tuning process (left) and after the tuning process (right).

The RF power incident on the tag is the same for both time periods, as shown by incident power indicator 702. The IC may be configured to operate according to a protocol, such as the Gen2 Specification, and may require a minimum amount of extracted power to operate according to the protocol, indicated by the "sufficient power to operate IC" (or "SPOI") requirement 704. IC operation according to the protocol may involve operating at a clock or oscillator frequency high enough to correctly demodulate and decode a protocol-compliant command sent from a reader and to correctly modulate and transmit a protocol-compliant response. Maintaining a clock frequency high enough to operate according to the protocol may require significant extracted power. The tuning circuit, on the other hand, may not be restricted by protocol requirements, and therefore may operate with a different, smaller amount of extracted power, as represented by the "sufficient power to tune" (or "SPTT") requirement 706.

Before tuning, much of the incident power is lost (represented by gray). As a result, the efficiency of the power extraction process (defined as the ratio of power extracted to total incident power) is relatively low, and the extracted power before tuning ("EPBT") 708 is insufficient to meet SPOI requirement 704, thereby preventing the IC from operating according to the protocol. However, the EPBT 708 is sufficient to meet the SPTT requirement 706, and therefore the tuning circuit 620 does have sufficient power to operate. Power extraction efficiency can be increased by improving the RF input impedance matching, which reduces the amount of incident RF power that is reflected, and/or by increasing rectifier efficiency, which increases the amount of absorbed (non-reflected) RF power that is converted to DC power. The tuning circuit 620 adjusts IC input section 610 to improve the impedance matching and/or rectifier efficiency, thereby increasing the efficiency of the power extraction process and improving the power transfer between the antenna and IC. The extracted power after tuning ("EPAT") 710 is larger than EPBT 708 as a result of the increased power extraction efficiency, and is sufficient to meet the SPOI requirement 704 even though the incident power 702 remains unchanged.

Figure 8:
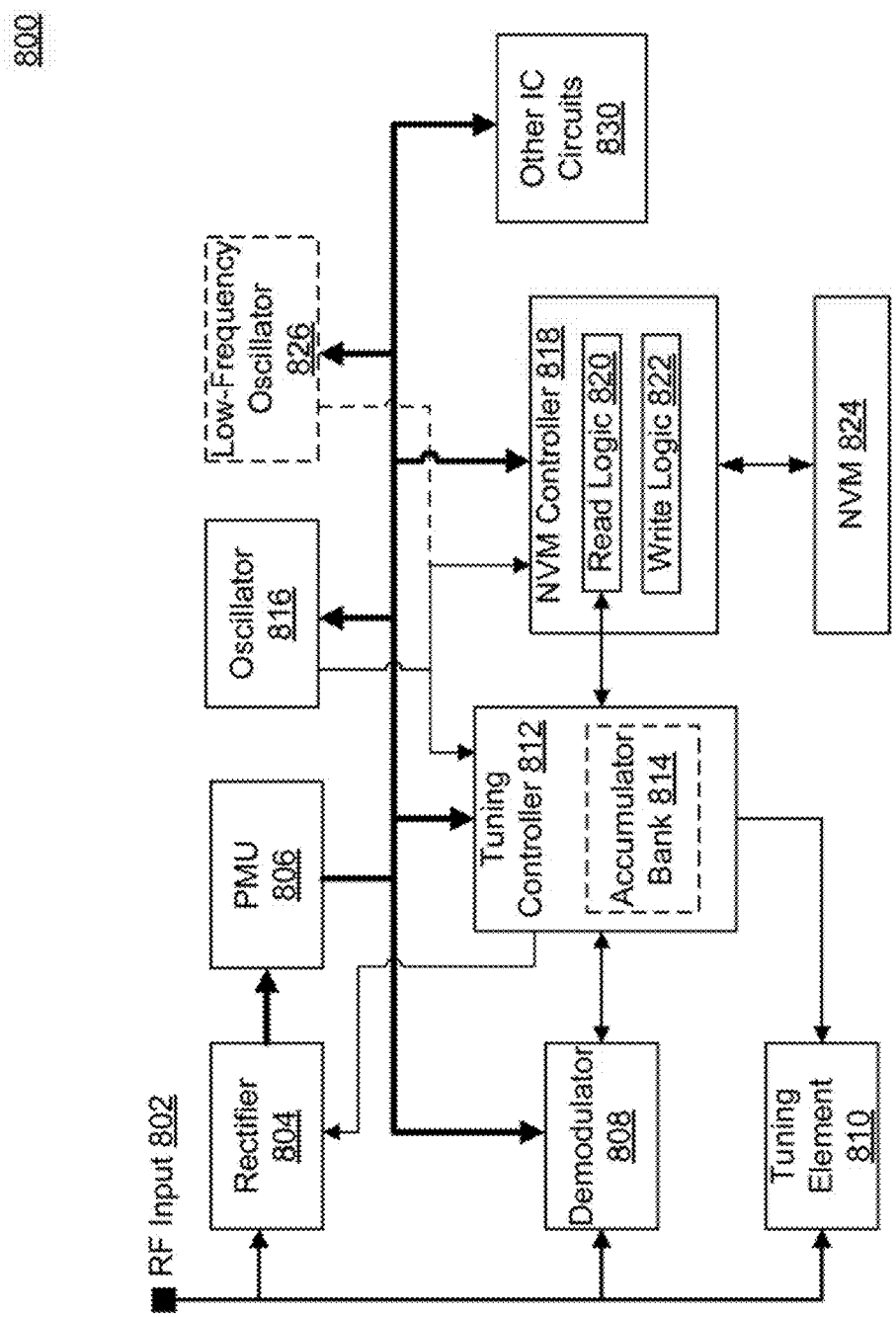
FIG. 8 depicts another diagram of an RFID tag front-end equivalent circuit including a tuning circuit, according to embodiments.

FIG. 8 depicts another diagram of an RFID tag front-end equivalent circuit 800 including a tuning circuit, according to embodiments. RF input 802, which may be coupled to one or more tag antennas, is coupled to rectifier 804, demodulator 808, and tuning element 810. Rectifier 804, configured to receive and rectify power from RF input 802, provides rectified power to PMU 806, which in turn distributes power to demodulator 808, tuning controller 812, oscillator 816, NVM controller 818, an optional low-power oscillator 826, and other IC circuits 830. In some embodiments, one or more of the components of circuit 800, such as tuning controller 816, NVM controller 818, and/or low-power oscillator 826, may receive power from different sources. For example, a secondary rectifier (not depicted) may provide rectified power to PMU 806 for distribution to various components, or may provide rectified power to various components directly. As another example, an energy storage element (not depicted) such as a capacitor or similar may provide power to PMU 806 for distribution and/or directly to various components. In some embodiments, rectifier 804 and/or PMU 806 may be configured to disable one or more components of the IC until the extracted power has been maximized or is sufficient to operate the IC according to a protocol.

Tuning controller 812 is configured to adjust the input impedance of the RFID tag and/or rectifier efficiency, and as such is coupled to tuning element 810 and rectifier 804. In some embodiments, tuning controller 812 receives information about signals on RF input 802 via demodulator 808 and stores the information in accumulator bank 814. For example, demodulator 808 may include a carrier peak detector (or "envelope detector") and/or an envelope peak detector (or "slicer peak detector"), one or both of which may be used to identify the peak voltage of an RF signal on RF input 802. Upon identifying the peak voltage for a given tuning setting, tuning controller 812 may store this information in accumulator bank 814. For example, accumulator bank 814 may include a number of registers at least equal to the number of available tuning settings, and may store peak voltage values and/or ranks corresponding to the available tuning settings in the registers. For another example, tuning controller 812 may store the tuning setting corresponding to the highest peak voltage in a register in accumulator bank 814 and may update the tuning setting stored in this register if a higher peak voltage is measured at a different tuning setting at a later time during the tuning process.

Tuning controller 812 is also coupled to at least read logic 820 of NVM controller 818, and also to write logic 822 in other embodiments. NVM controller 818 and its associated read logic 820/write logic 822 are in turn configured to read, write, erase, and/or otherwise modify data stored in NVM 824. In some embodiments, NVM 824 may store tuning settings, and tuning controller 812 may be configured to read the tuning settings from NVM 824 via NVM controller 818.

Oscillator 816 may be configured to provide an oscillator or clock signal to at least tuning controller 812 and NVM controller 818, and may also provide oscillator/clock signals to any of the other components depicted in circuit 800. For example, oscillator 816 may provide clock signals to other IC circuits 830 to enable the IC to operate according to a protocol, and/or may provide clock signals to NVM controller 818 to fully enable read, write, erase, and modification operations on NVM 824. In some embodiments, oscillator 816 may only be able to provide clock signals with frequencies high enough for IC operation according to a protocol and/or full NVM functionality when extracted power is greater than SPOI, as described above.

In some embodiments, rectifier 804 contributes a significant portion or substantially all of the IC input resistance (e.g., Rp 612). Moreover, the IC input resistance may vary according to the biasing of rectifier 804. Accordingly, tuning controller 812 may be coupled to rectifier 804 in order to adjust the rectifier's current and/or voltage bias, thereby changing the IC input resistance. In some embodiments, the biasing of rectifier 804 may affect the resonance characteristics (represented by a "Q-factor") of the IC and coupled antenna, as well as the efficiency of rectifier 804 with respect to rectification. In these embodiments, tuning controller 812 or another processor block in the IC may adjust the biasing of rectifier 804 in order to adjust the IC-antenna Q-factor and/or the rectifying efficiency of rectifier 804.

Tuning controller 812 may adjust the biasing of rectifier 804 in the same way it adjusts tuning element 810. For example, tuning controller 812 may vary the rectifier biasing during the tuning process and select the biasing that provides a suitable extracted power. In some embodiments, tuning controller 812 may retrieve stored rectifier bias settings from NVM 824 to use in adjusting the biasing of rectifier 804. For example, an IC or tag manufacturer may store a number of rectifier bias settings in NVM 824, each corresponding to the real portion (for example, R1 602 as described in FIG. 6) of a different antenna impedance. As another example, a tag manufacturer may store a single rectifier bias setting in NVM 824 before, during, and/or after attaching the IC to an antenna-bearing inlay, where the stored bias setting is selected by the manufacturer to correspond to the real impedance portion of the antenna on the inlay.

As described above, tuning controller 812 may retrieve tuning settings for tuning element 810 and/or bias settings for rectifier 804 from NVM 824 during a tuning process. While extracted power during the tuning process may be sufficient for tuning controller 812 to operate (i.e., above SPTT), the extracted power may not be sufficient to fully enable NVM controller 818. For example, the extracted power may not be sufficient to fully power oscillator 816, which in turn may not be able to provide a clock signal with a frequency high enough for full NVM functionality. As another example, the extracted power may not be sufficient for NVM controller 818 to perform power-intensive NVM operations, such as write operations.

In some embodiments, if NVM controller 818 is unable to operate in a first, fully-powered mode of operation due to insufficient power, NVM controller 818 (or portions of NVM controller 818) may be able to operate in a second, lower-power mode. In the second mode of operation, NVM controller 818 (or portions of NVM controller 818) may provide reduced functionality, thereby consuming lower power and/or operating with a lower-frequency clock signal as compared to the first mode. For example, read logic 820 may be able to read data from NVM 824 using less power and/or a relatively low-frequency clock signal than other NVM operations, such as write operations performed by write logic 822. Accordingly, NVM controller 818 (or portions of NVM controller 818) may provide data read capability in both the first, full-power mode and the second, lower-power mode, but reduce functionality in the second, lower-power mode by disabling data write capability. In some embodiments, NVM controller 818 may reduce functionality when operating in the second mode by generally disabling or curtailing the operation of relatively high-power hardware components, such as write logic 822. For example, NVM controller 818 may disable a hardware component entirely, or may operate the hardware component with reduced clock frequencies, at reduced speed, with reduced throughput, or otherwise curtail full operation of the hardware component.

In some embodiments, the data read functionality provided by NVM controller 818 and/or read logic 820 may differ based on the mode of operation. For example, during operation in the first mode, read logic 820 may be configured to read data from a location in NVM 824 in response to a command from a reader specifying the location. In contrast, during operation in the second mode, read logic 820 may be configured to read data from a preset location in NVM 824, and may not read data from locations specified by reader commands. For example, during the tuning process where NVM controller 818 and/or read logic 820 are operating in the second mode, the tag may not be configured to process or respond to reader commands. In some embodiments, components in NVM controller 818 and/or read logic 820 associated with decoding read location address vectors may be disabled during operation in the second mode in order to reduce power consumption. The preset NVM location may be hardwired or stored in another, known NVM location. In some embodiments, NVM controller 818 and/or read logic 820 may be configured to select from two or more preset NVM locations based on the state of a persistent flag or bit. The persistent bit or flag, similar to session flags as described in the Gen2 Specification, may be configured to store its value for at least some period of time, and may be implemented on NVM 824, on a register, and/or on any other suitable device. The persistent flag or bit may be set automatically by the IC at a suitable time and/or in response to a previously-received reader command.

In some embodiments, an optional low-frequency oscillator 826 may supply the relatively low-frequency clock signal to NVM controller 818 or read logic 820, although in other embodiments oscillator 816 itself may be configured to supply the relatively low-frequency clock signal instead of optional low-frequency oscillator 826.

Read logic 820 and/or low-frequency oscillator 826 may be able to operate when the extracted power is greater than SPTT but below SPOI. In these embodiments, when tuning controller 812 attempts to adjust tuning element 810 and/or rectifier 804 to increase extracted power, read logic 820 may perform read operations on data in NVM 824 in response to attempts from tuning controller 812 to read tuning and/or bias settings from NVM 824.

In some embodiments, NVM 824 may store information about the tuning process itself. For example, NVM 824 may store tuning parameter(s) indicating whether the tuning process should be enabled or disabled, and under what conditions the tuning process should be enabled or disabled. In these embodiments, tuning controller 812 may read the tuning process information (via read logic 820) to determine whether to perform the tuning process. As another example, NVM 824 may store information indicating whether the tag should detune itself (i.e., configure tuning element 810 and/or rectifier 804 to decrease power extraction). A tag may detune itself to reduce its coupling with an incident RF wave, thereby reducing interference with nearby tags and allowing those tags to couple to and extract power from the RF wave. In embodiments where multiple tags are present in relatively close proximity, an RFID reader, upon inventorying a particular tag, may instruct the tag to detune itself for some particular time duration to allow other, nearby tags to extract sufficient power for inventorying. The reader may instruct the tag to detune itself by setting a persistent flag, bit, or data value in NVM 824 or elsewhere, and tuning controller 812 may be configured to perform detuning based on the persistent flag, bit, or data value. In some embodiments, the tag itself may determine that it should be detuned based on, for example, whether it has been inventoried and/or whether it has detected RF interference.

Figure 9:
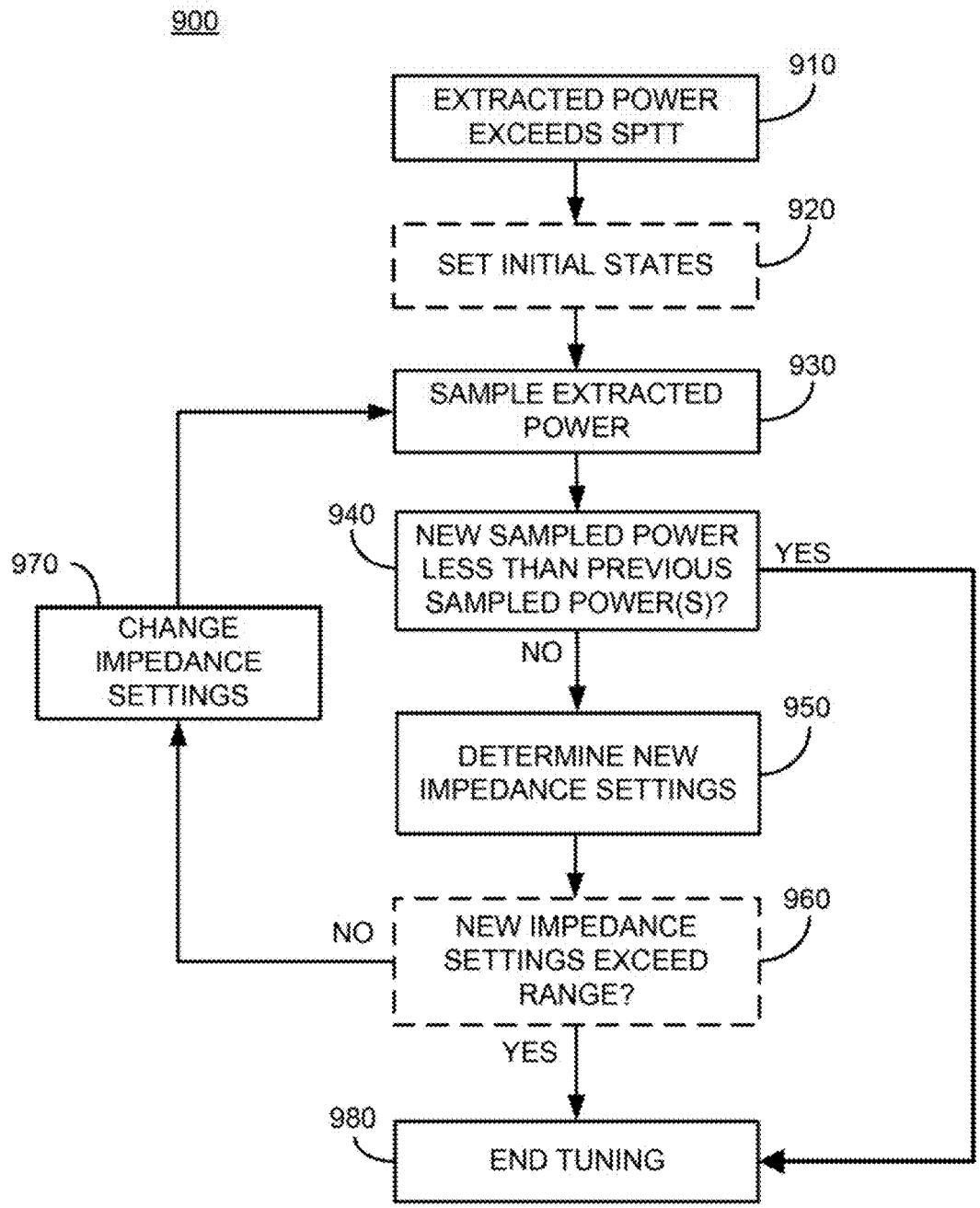
FIG. 9 is a flowchart for an RFID tag tuning process according to embodiments.

FIG. 9 is a flowchart for an RFID tag tuning process 900 according to embodiments. Tuning process 900 begins with step 910, where an RFID tag with an antenna, an IC, a tuning element, and a tuning circuit extracts power from an incident RF wave at a level exceeding the SPTT. In some instances the extracted power will be less than an SPOI, in which case the tag IC will not have sufficient power to operate according to a protocol. However, the tuning circuit does operate, because the extracted power is greater than the SPTT. In optional step 920, the tuning circuit may set the tuning element and/or an IC rectifier to initial states. In some instances the tuning circuit may set the initial states via a tuning algorithm, or retrieve the initial states from a memory and apply it to the tuning element and/or rectifier, or may use a previous state of the tuning element or rectifier as the initial state. In other instances the tuning element and/or rectifier will set or reset itself to an initial state.

In step 930, the tuning circuit samples the power extracted by the RFID tag, either to determine a baseline value (at the beginning of the tuning process) or to evaluate the effect of an impedance change (during the tuning process). If the latter then the tuning circuit in step 940 determines if the newly sampled power value is less than one or more previously sampled power values. If not then the tuning continues. If so then the tuning circuit may assume that the power transfer and extraction has been maximized, and the process then moves to step 980 where the tuning circuit halts the adjustment process. In some embodiments the criterion for whether the impedance value has been optimized and the extracted power has been maximized may be complex, especially in cases where the relationship between the tuning element and the extracted power is not monotonic. In such circumstances the tuning circuit may use a search algorithm (in some cases including techniques available to those versed in computer science and/or machine learning) to determine if the power transfer can be improved further, even if the newly sampled power value is less than prior samples.

If the newly sampled power value exceeds the previously sampled value(s) or if the tuning circuit determines that power transfer can be further improved then the tuning circuit determines new settings for the tuning element and/or the rectifier in step 950. The tuning circuit may determine the new settings in a variety of ways, such as using fixed steps, binary tree-traversal, proportional to the prior improvement, or using another algorithm as will be well known to those skilled in the engineering discipline. The new settings will, in general, be based on the most recent sampled power value (and in some embodiments, multiple previous power samples). In optional step 960 the tuning circuit may check if the new settings exceeds the tuning range of the tuning element and/or the rectifier. If so then the tuning circuit may halt the tuning process at step 980.

If the new settings do not exceed the tuning element/ rectifier tuning ranges then the tuning circuit adjusts the tuning element and/or the rectifier based on the new settings in step 970. The tuning process then loops back to step 930, where a new sample of the extracted power is taken to evaluate the effect of the tuning adjustment. The tuning process 900 iterates through steps 930-970 until the extracted power in step 940 reaches a maximum (implying the impedance match is optimized) or until further tuning adjustments would exceed the tuning ranges of the tuning element and/or rectifier (e.g. as determined in optional step 960).

At the conclusion of tuning process 900, in step 980, the final tuning settings may be stored in a tag memory. In some embodiments an RFID reader may be able to read the final tuning settings from the memory or instruct the tag IC to transmit them to the reader.

In some embodiments, both the extracted power and the reflected power may be sampled in step 930 and used in the determination of step 940. In these embodiments, increases in extracted power coupled with decreases in reflected power correspond to improved power transfer. The additional information provided by the reflected power may be useful, for example, in cases where the RFID tag is moving with respect to the RF power source and therefore the incident power is changing. By itself, an increase in extracted power after an impedance adjustment may result from a tag moving closer to a power source and not from better power transfer. However, by measuring both extracted and reflected power the tuning circuit can determine if the increase in extracted power is due to tag motion or to the impedance adjustment.

The steps described in process 900 are for illustrative purposes only. An RFID IC may adjust a tuning element and/or a rectifier bias to improve power transfer using additional or fewer steps and in different orders using the principles described herein. Steps may be reordered, eliminated, or added according to other embodiments. For example, in some embodiments, a tag may adjust its tuning element and/or rectifier based on a reader command or by directly loading stored settings instead of using an iterative process. In some embodiments a tag may adjust its tuning element and/or rectifier even if the currently extracted power is equal to or greater than the SPOI, or even if it does not yet know what the currently extracted power value is. For example, the tag may adjust its tuning element and/or rectifier regardless of the value of the currently extracted power, or such that extracted power is significantly greater than the SPOI. As another example, the tag may adjust its tuning element and/or rectifier to detune itself as described above, in order to reduce its coupling to an incident RF wave.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

Embodiments as described herein additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Executing a program's steps or instructions may further require storage media that have stored thereon a program's instructions and/or data, typically in a machine-readable form. This storage media is typically termed a memory, read by a processor or other machine element. In electronic devices the memory may be implemented as Read Only Memory (ROM), Random Access Memory (RAM), and many others as will be well known to those skilled in the art. In some embodiments the memory may be volatile and in others nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A Radio-Frequency Identification (RFID) integrated circuit (IC) requiring a sufficient power to operate according to a protocol (SPOI), the IC comprising:
   a rectifier configured to extract power from a radio-frequency (RF) wave and provide the extracted power to the IC; and
   a tuning circuit capable of tuning a bias of the rectifier upon receiving a sufficient power to tune (SPTT), wherein:

in response to the extracted power being less than the SPOI and the tuning circuit receiving power equal to or greater than the SPTT, the tuning circuit is configured to tune the bias of the rectifier such that the rectifier provides an extracted power after tuning (EPAT) equal to or greater than the SPOI.

2. The RFID IC of claim 1, wherein at least one of:
the rectifier is configured to provide power to the tuning circuit; and
the IC further includes another rectifier configured to provide power from the RF wave to the tuning circuit.

3. The RFID IC of claim 1, wherein the tuning circuit is configured to tune the rectifier bias to adjust at least one of:
a resistance associated with the IC;
a Q-factor associated with the IC; and
an efficiency of the rectifier.

4. The RFID IC of claim 1, further comprising a nonvolatile memory (NVM), wherein the tuning circuit is further configured to at least one of:
read a rectifier bias setting from the NVM and tune the rectifier based on the rectifier bias setting; and
read an impedance tuning setting from the NVM and adjust a variable impedance coupled to the rectifier based on the impedance tuning setting.

5. The RFID IC of claim 4, wherein:
the IC is configured to read from the NVM in a first read mode in response to the extracted power being equal to or greater than the SPOI;
the IC is configured to read from the NVM in a second read mode in response to the extracted power being less than the SPOI, and
the second read mode has reduced functionality compared to the first read mode.

6. The RFID IC of claim 5, wherein the IC is configured to read from the NVM in the second, reduced-functionality read mode by reading from a preset NVM location without receiving a reader command instructing the IC to read from the preset NVM location.

7. The RFID IC of claim 5, wherein the IC is configured to enable at least one hardware component of the NVM in the first read mode and disable the at least one hardware component in the second, reduced-functionality read mode.

8. The RFID IC of claim 5, wherein a clock frequency associated with the NVM is higher in the first read mode than in the second, reduced-functionality read mode.

9. A method for a Radio Frequency Identification (RFID) integrated circuit (IC) requiring a sufficient power to operate according to a protocol (SPOI), the method comprising:
receiving, through a variable impedance, a radio-frequency (RF) wave;
extracting, from the RF wave, an extracted power;
in response to the extracted power being less than the SPOI:
reading an impedance tuning setting from a nonvolatile memory (NVM); and
adjusting the variable impedance based on the impedance tuning setting to increase the extracted power.

10. The method of claim 9, wherein the variable impedance includes a plurality of capacitors, at least two of which have different capacitance values.

11. The method of claim 9, further comprising:
reading from the NVM in a first read mode in response to the extracted power being equal to or greater than the SPOI; and
reading the impedance tuning setting from the NVM in a second read mode in response to receiving power less than the SPOI, wherein the second read mode has reduced functionality compared to the first read mode.

12. The method of claim 11, wherein reading the impedance tuning setting from the NVM in the second, reduced-functionality read mode comprises reading from a preset second data location in the NVM without receiving a reader command instructing the IC to read from the preset NVM location.

13. The method of claim 11, further comprising enabling at least one hardware component of the NVM in the first read mode and disabling the at least one hardware component in the second, reduced-functionality read mode.

14. The method of claim 11, wherein a clock frequency associated with the NVM is higher in the first read mode than in the second, reduced-functionality read mode.

15. A Radio Frequency Identification (RFID) integrated circuit (IC) requiring a sufficient power to operate according to a protocol (SPOI), the IC comprising:
a nonvolatile memory (NVM) configured to:
operate in a first read mode; and
operate in a second read mode with reduced functionality compared to the first read mode, wherein the IC is configured to:
read a first data value from the NVM in the first read mode in response to the IC receiving power equal to or greater than the SPOI; and
read a second data value from the NVM in the second, reduced-functionality read mode in response to the IC receiving power less than the SPOI.

16. The RFID IC of claim 15, wherein the NVM is configured to:
operate in the first read mode by providing the first data value from a first data location based on a reader command; and
operate in the second, reduced-functionality read mode by providing the second data value from a preset second data location without receiving a reader command instructing the IC to read from the preset second data location.

17. The RFID IC of claim 15, wherein the NVM is configured to:
operate in the first read mode by providing the first data value from a first data location based on a reader command; and
operate in the second, reduced-functionality read mode by providing the second data value from a second data location based on a state of a persistent bit.

18. The RFID IC of claim 15, further configured to determine whether tuning of the IC is to be enabled or disabled based on the second data value.

19. The RFID IC of claim 15, further configured to, based on at least one of the first and second data values, detune the IC to reduce the power received by the IC.

20. The RFID IC of claim 15, further configured to enable at least one hardware component of the NVM in the first read mode and disable the at least one hardware component in the second, reduced-functionality read mode.

* * * * *